United States Patent [19]

Taylor

[11] Patent Number: 5,433,239
[45] Date of Patent: Jul. 18, 1995

[54] DOWNSTREAM FLUID PRESSURE RESPONSIVE EMERGENCY SHUTDOWN VALVE

[76] Inventor: Julian S. Taylor, 8300 SW. 8, Oklahoma City, Okla. 73128

[21] Appl. No.: 330,951
[22] Filed: Oct. 28, 1994
[51] Int. Cl.6 ........................................... F16K 31/12
[52] U.S. Cl. ..................... 137/69; 137/501; 137/549
[58] Field of Search ............... 137/68.1, 69, 501, 498, 137/549; 251/121

[56] References Cited

U.S. PATENT DOCUMENTS

| | | | |
|---|---|---|---|
| 2,881,793 | 4/1959 | Lee | 137/501 |
| 4,210,171 | 7/1980 | Ributa | 137/501 |
| 4,724,857 | 2/1988 | Taylor | 137/71 X |
| 4,776,365 | 10/1988 | Bathnick et al. | 137/549 X |
| 4,922,950 | 5/1990 | Taylor | 137/316 |
| 5,080,128 | 1/1992 | Taylor | 137/316 |

Primary Examiner—John C. Fox
Attorney, Agent, or Firm—Robert K. Rhea

[57] ABSTRACT

In a fluid flow emergency shutdown valve a valve body is transversely interposed in a fluid line upstream with respect to a flow restricting unit, A valve stem is longitudinally slidably supported by the valve body and referenced to atmosphere at its respective ends, The valve stem supports a valve normally disposed upstream with respect to its seat. The other end portion of the valve stem supports a piston fluid pressure balanced by downstream fluid pressure from the outlet port of the flow restricting unit in combination with the buckling point value of a collapsible pin axially abutting the downstream end of the valve stem, A decrease in downstream fluid pressure below a predetermined value increases the pressure differential across the piston from its upstream to its downstream side which moves the piston to buckle the collapsible pin and move the valve to a closed position.

4 Claims, 2 Drawing Sheets

DOWNSTREAM FLUID PRESSURE RESPONSIVE EMERGENCY SHUTDOWN VALVE

BACKGROUND OF THE INVENTION

1. Field of the Invention

This invention relates to fluid flow control valves and more particularly to a valve biased closed when pressure differential across a piston in the valve reaches a critical value.

On installations where fluid moving through a line must be filtered to remove extraneous matter from the liquid it is important that the filter be changed or cleaned prior to being saturated with flow restricting impurities.

In the event the filter is not changed before becoming overloaded with impurities, the filter may rupture and release such impurities downstream which may be detrimental to the equipment or process supplied with the fluid.

This invention provides a valve connected inline with a downstream flow restricting unit. A piston on a valve stem moves a valve to a closed position when pressure differential across the piston exceeds a predetermined value.

2. Description of the Prior Art

I do not know of any patents which are particularly pertinent to this invention. However, one embodiment of this invention employs manually adjustable superposed mating and mismating discs in a downstream flow restricting unit disclosed in my U.S. Pat. Nos. 4,922,950 and 5,080,128 respectively issued to me on May 8, 1990 and Jan. 14, 1992 for Restrictor Valves.

SUMMARY OF THE INVENTION

A longitudinally bored valve body having lateral inlet and outlet ports forming a fluid passageway therebetween is connected is series with a downstream filter or flow volume restrictor unit. The inner wall of the valve body is provided with a valve seat intersecting the flow passageway.

The valve body slidably supports a valve stem referenced at respective ends to atmosphere. The valve stem supports a valve on its upstream end portion for seating and unseating on the valve seat and closing the fluid passageway. The downstream end portion of the valve stem supports a piston.

The outlet port of the filter or flow restrictor unit is connected in fluid communication with the interior of the valve body on the low pressure side of the differential sensing piston opposite the valve seat. Cage means secured to and projecting beyond the valve body on the downstream side of the piston axially supports a collapsible pin abutting the adjacent end portion of the valve stem for normally maintaining the valve off seat.

The principal object of this invention is to provide a valve maintaining fluid flow by a predetermined pressure differential across a piston contained by the valve which interrupts fluid flow through the valve in response in fluid pressure differential across the piston beyond a predetermined critical valve.

DESCRIPTION OF THE PREFERRED EMBODIMENTS

Like characters of reference designate like parts in those figures of the drawings in which they occur.

Figures 1, 3:
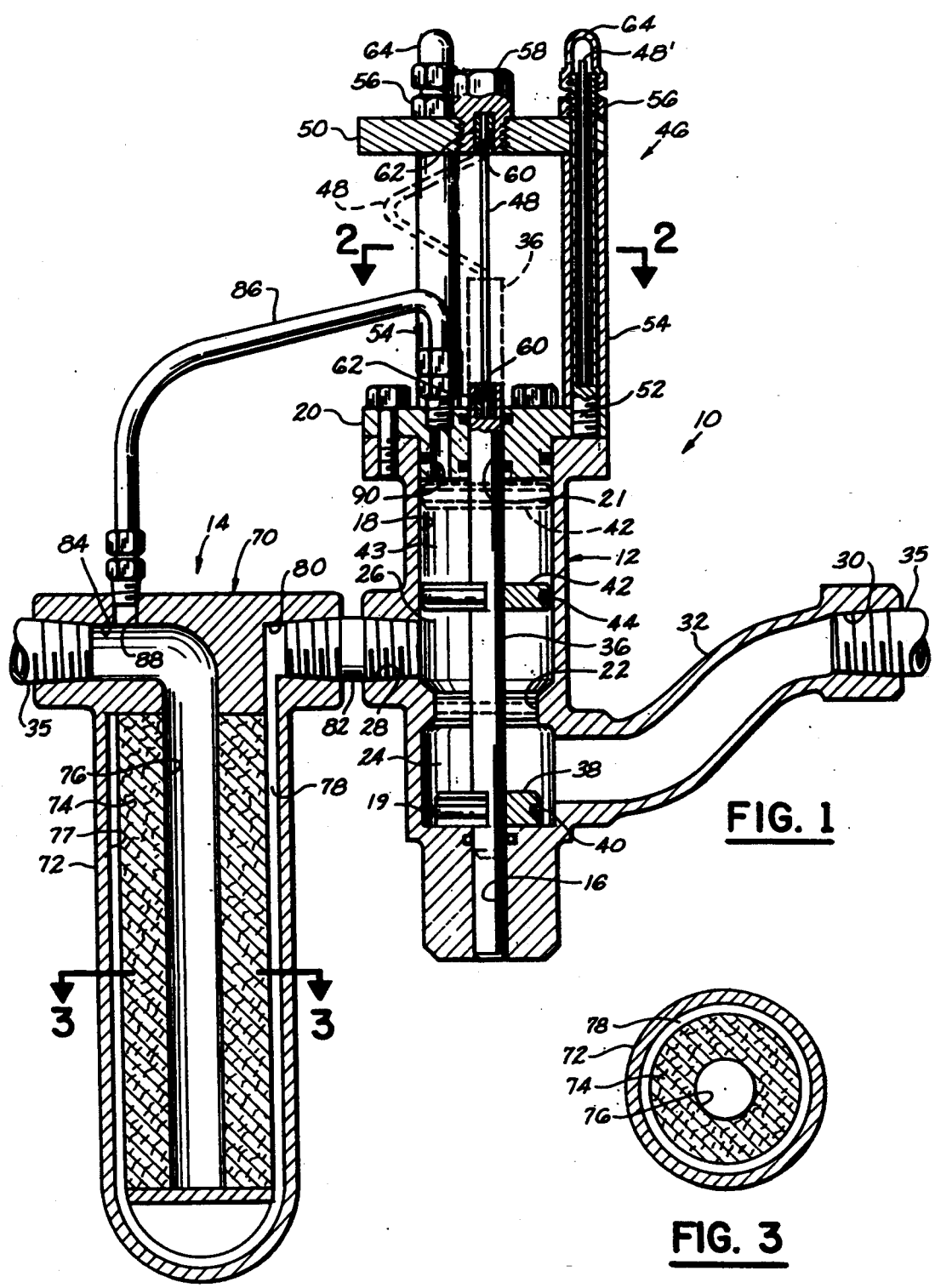
FIG. 1 is a vertical cross sectional view through a preferred form of the valve and a downstream filter and illustrating, by broken lines, the closed position of the valve.
FIG. 3 is a horizontal cross sectional view taken substantially along the line 3—3 of FIG. 1.
Figure 2:
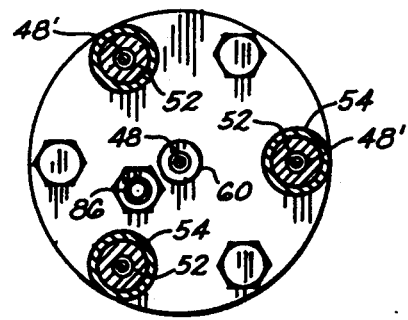
FIG. 2 is a horizontal cross sectional view, partially in elevation, taken substantially along the line 2—2 of FIG. 1.

Referring first to FIGS. 1-3 the reference numeral 10 indicates a preferred embodiment of the invention comprising a valve body 12 connected with a flow restriction unit 14, such as a filter 14 as more fully described herein below.

The valve body 12 is elongated cylindrical in general configuration, in the example shown, and is centrally drilled from a downstream end portion, as at 16 and is counterbored, as at 18, from its other end portion terminating in a shoulder 19. The counterbore 18 is closed by a cap 20 having a central bore 21.

The inner wall of the valve body is provided with a valve seat 22 forming an upstream chamber 24 and a downstream chamber 26 on opposite sides of the valve seat 22. The valve body is provided with an outlet port 28 communicating with the downstream chamber 26. An inlet port 30, in axial alignment with the outlet port 28, is connected with the valve body by an inlet neck 32 communicating with the upstream chamber 24 for forming a flow passageway from the inlet port 30 through the body to the outlet port 28.

An elongated valve stem 36 is slidably support at its respective upstream and downstream end portions by the body bore 16 and the cap bore 21 and is referenced at respective ends to atmosphere for the purposes presently explained.

A disc-like valve 38, surrounded by an O-ring 40, is secured to the valve stem 36 adjacent the counterbore end shoulder 19 for movement with the valve stem and seating and unseating on the valve seat 22, as presently explained.

Similarly, a disc-type piston 42, surrounded by an O-ring 44 slidably sealing with the inner wall surface with the counterbore 18, is secured to the valve stem 36 on the downstream side of the valve seat 22 forming a piston chamber 43. The piston 42 moves with the valve stem toward and away from the valve body cap 20 as hereinafter explained.

Pin cage means 46 supported by the body cap 20 axially supports one end portion of a fluid pressure responsive, collapsible pin 48 having a predetermined buckling value and having its other end portion in axial contact with the adjacent end portion of the valve stem 36 for normally maintaining the valve 38 adjacent the counterbore shoulder 19. The pin cage means 46 comprises a top plate 50 maintained in parallel axial spaced relation with respect to the cap 20 by a plurality of posts 52 threadedly secured to the top plate in radial and circumferential equally spaced relation. A like plurality of sleeves 54 respectively surround the posts 52 and a post nut 56 is threadedly connected with the end of the respective post opposite the cap 20.

The end plate 50 is centrally bored and threaded for receiving a pin support nut 58. The confronting ends of the pin holding nut 58 and the valve stem 36 are coaxially drilled to form sockets 60 respectively receiving pin guide inserts 62 for nesting a respective end portion of the collapsible pin 48. Each of the posts 52 are axially drilled opposite for receiving spare pins 48' which are maintained within the respective post by acorn nuts or caps 64.

The flow restrictive unit 14 comprises a generally cylindrical head portion 70 having a laterally projecting cylindrical filter housing 72 containing a cylindrical filter element 74 having a coextensive central opening 76.

The periphery of the filter element 74 is disposed in inward spaced relation with the respect to the inner wall surface 77 of the filter housing 72 forming an annular fluid space 78 between the filter 74 and the inner wall surface of the filter housing 72.

One end of the filter head 70 is centrally bored to form an inlet port 80 in fluid communication with the annular fluid space 78. An all thread nipple 82 connects the filter inlet port 80 with the valve body outlet port 28. The other end of the filter head 70 is centrally bored to form an outlet port 84 in fluid communication with the filter central opening 76.

A length of bypass tubing 86 is connected at its respective ends with a lateral bore 88 in the filter head in communicating with its outlet port 84 and an offset bore 90 in the valve cap 20 communicating with the piston opposite the valve seat 22 valve chamber 26 to supply fluid pressure from the outlet port 104 of the filter to the piston chamber 43 which, in combination with atmospheric, pressure on respective ends of the valve stem 36 and the resistance of the collapsible pin 48 normally balances upstream and downstream fluid pressure across the piston 42.

Figure 5:
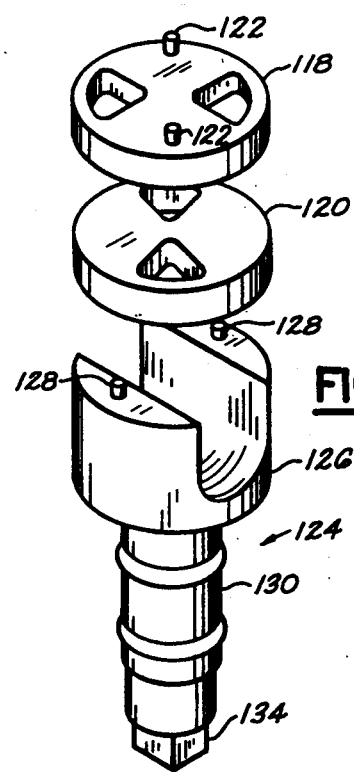
Figure 4:
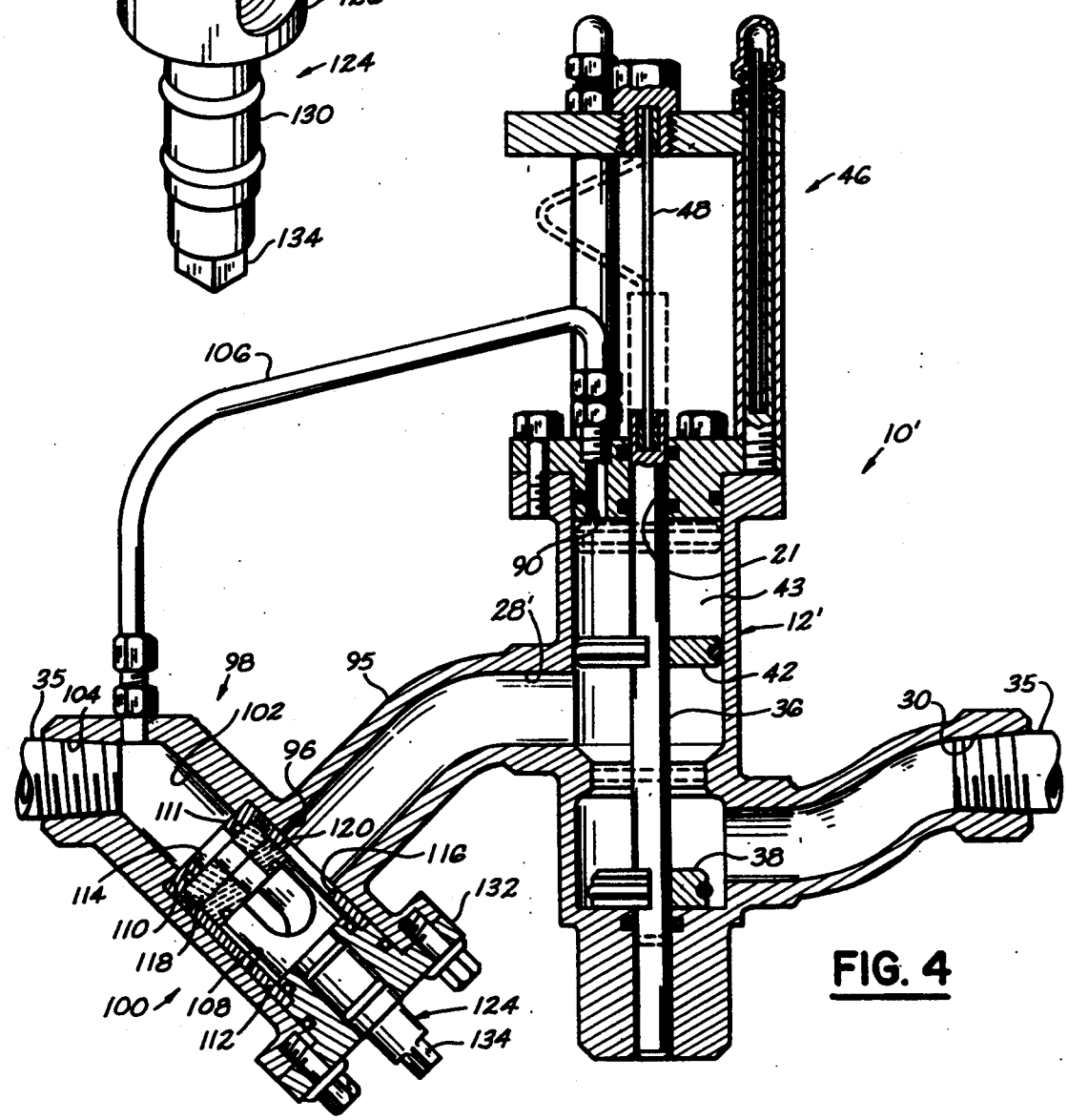
FIG. 4 is a vertical cross sectional view similar to FIG. 1 illustrating a second embodiment of the valve connected with a downstream flow restrictor; and, FIG. 5 is an exploded perspective view to a larger scale of the flow restriction discs and a disc control yoke to a larger scale.

Referring also to FIGS. 4 and 5 the reference numeral 10' indicates another embodiment of the invention in which the valve body and its several components are identical, and bear identical numerals, with the embodiment 10 with the exception the valve body 12' outlet port 28' is connected by an outlet tube 95 with the inlet port 96 of a flow restrictor valve 98.

The restrictor valve 98 comprises a body 100 axially drilled from each to form a flow passageway 102 and define an outlet port 104 in axial alignment with the valve body inlet port 30. Other tubing 106 similarly connects the inlet port 104 with the valve body cap bore 90 the end of the valve body passageway opposite its outlet port 104 is counterbored at 108 to intersect the inlet port 96 and form an upstream facing counterbore shoulder 110 which supports the end wall 111 of a sleeve 112 having an end wall fluid outlet aperture 114 and open at its opposite end. The wall of the sleeve 112 is further provided with an inlet port 116 in alignment with the inlet port 96.

A pair of apertured mating and mismating apertured discs 118 and 120 are disposed in superposed relation adjacent the inner wall surface of the sleeve end wall 111 with the disc 118 apertured in register with the sleeve end wall opening or openings 114. The disc 118 is anchored to the sleeve end wall 111 by pins 122 (FIG. 5) entering cooperating sockets in the sleeve end wall.

A yoke member 124 having a Y-shaped cylindrical inner end portion 126 loosely received by the bore of the sleeve 112, axially abutts the disc 120 and is secured thereto for rotating this discs by other pins 128 (FIG. 5) entering cooperating sockets in the adjacent face of the disc 120. The yoke 124 includes a stem portion 130, o-ring sealed with the central bore of a restrictor body cap 132, closing the counterbore 108, and secured to the restrictor valve body by bolts. The inward end of the cap 132 has a rabbitted periphery for nesting the adjacent peripheral end edge portion of the sleeve wall for impinging the sleeve end wall against the shoulder 110 and similarly impinging the yoke 126 against the rotating disc 120 in contiguous face-to-face contact with the stationery disc 118.

The disc 120 is angularly rotated manually by wrench flats 134 on the outward end of the stem 130 for increasing or decreasing the volume of fluid passing through the restrictor valve 98 and obtaining a desired pressure drop across the piston 42.

OPERATION

In operation, assuming the valve body and restrictor unit has been interposed in a fluid line 35. In the aperture of the embodiment 10 the downstream fluid pressure from the filter opening 84 in the piston chamber 43 it is usually between 50 psi and 100 psi according to the type of filter 14 used. This downstream fluid pressure in combination with the rating of the collapsible pin axially abutting the downstream end of the valve stem 36 balances the fluid pressure across the piston 42.

When impurities collected by the filter element 74 restricts fluid flow through the filter such that it reduces the downstream fluid pressure in the piston chamber 43 below a predetermined value pressure differential across the piston 42 forces the piston toward the adjacent surface of the cap 20 which collapses the pin 48 to its dotted line position of FIG. 1 and moving the valve 38 to its seat 22 interrupting fluid flow through the valve body 12.

Operation of the other embodiment 10' is substantially identical with the operation described hereinabove for the embodiments with the exception the downstream restrictor unit 98 disc 120 is manually adjustable for mating and mismating the apertures in the discs 118 and 120 to achieve the desired volume flow through the restrictor unit 98. In the event of a malfunction which reduces downstream fluid pressure in the piston chamber 43, the piston 42 similarly biases the valve 38 to its seat 22 to close flow through the valve body 12'.

The flow restricting units 14 and 98 are shown and described as examples of conventional flow restrictors. It seems obvious that the valves 10 and 10' may be used with a simple flow restrictor having a fixed orifice.

Obviously the invention is susceptible to changes or alterations without defeating its practicability. Therefore, I do not wish to be confined to the preferred embodiment shown in the drawings and described herein.

I claim:

1. A downstream differential fluid pressure responsive shutdown valve, comprising:
   a valve body having a fluid passageway and inlet and outlet ports and a valve seat therebetween;
   a valve stem slidably supported by the valve body and having upstream and downstream ends referenced to atmosphere;
   a normally open valve on the upstream end portion of said valve stem and movable with the valve stem toward and away from the valve seat;

a piston on the downstream end portion of said fluid valve stem forming a piston chamber isolated from the passageway;

flow restrictor means having inlet and outlet openings at respective ends of a fluid flow reducing passageway connected in series downstream with respect to the valve body outlet port;

means including bypass tubing communicating fluid pressure in the restrictor body outlet opening with the piston chamber for sensing a predetermined pressure differential across the piston; and, collapsible pin means including a pin having a predetermined buckling point axially abutting the upstream end of the valve stem for normally maintaining said valve off seat, whereby pressure differential greater than the predetermined value biases the piston in a pin collapsing valve closing direction.

2. The shutdown valve according to claim 1 in which the flow restrictor means includes:

a filter element interposed in the fluid flow reducing passageway of the flow restrictor means.

3. The shutdown valve according to claim 1 in which the flow restrictor means includes:

mating and mismating discs interposed in the fluid flow reducing passageway of the flow restrictor means.

4. The shutdown valve according to claim 1 in which the flow restrictor means further includes:

yoke means contained by the flow reducing passageway for angularly rotating one disc relative to an adjacent disc for increasing or decreasing the volume of fluid flowing through the fluid flow reducing passageway.

* * * * *